3,132,178
PROCESS FOR PREPARING AURAMINE USING UREA

Robert G. Weyker, North Plainfield, and Robert M. Yarrington and Samuel M. Gerber, Bound Brook, N.J., assignors to American Cyanamid Company, New York, N.Y., a corporation of Maine
No Drawing. Filed Apr. 4, 1961, Ser. No. 100,504
7 Claims. (Cl. 260—566)

This invention relates to an improved process for the preparation of auramine and its analogs. More specifically it provides for an increase in yield by the introduction of a novel constituent, a urea, into the reaction mixture.

Auramine and its analogs are among the best known dyes. They have been manufactured and sold in large quantities for many years. Its synthesis has become so well known as to be almost conventional. As a consequence, even a relatively small increase in yield is economically important.

The procedure which is conventionally employed in its manufacture may be illustratively represented as follows:

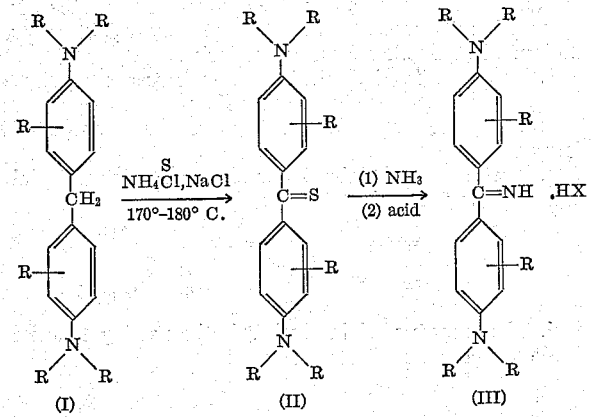

wherein each of the "R" radicals is hydrogen or lower alkyl. In auramine (C.I. 41,000) which will be used herein to generically represent the class, R is methyl. In this process, the methane base (I), along with sulfur, ammonium chloride and common salt are heated in a reactor to temperatures of about 170°–180° C. Salt, which is present as a diluent, is used in large amounts. A thioketone intermediate (II) is formed but not isolated. Anhydrous ammonia gas is simultaneously introduced into the heated reaction mixture whereupon the ketonimine is formed and later isolated as a salt, e.g., hydrochloride, by salting out from aqueous solution to give the desired auramine dyestuff.

The present invention is based on the discovery that increased yields are obtained by carrying out the preparation of these auramine dyestuffs in the presence of urea. It is conveniently added to or substituted for at least a part of the salt customarily employed. The term "urea" is used to designate the suitable urea compounds which include urea itself and symmetrical di- (lower alkyl) ureas, e.g., N,N'-dimethyl urea, N,N'-diethyl urea, N,N'-dipropyl urea, N,N'-dibutyl urea, N,N'-diamyl urea, and N,N'-dihexyl urea. In view of its low cost and availability, urea itself, is perhaps preferable for the purposes of this invention.

In the conventional process, from 7 to 10 parts of salt per part of the methane base ordinarily are used. In the process of this invention, all or a part of the salt is replaced by a urea compound. As a minimum, at least about 0.7 part of the urea per part by weight of the methane base should be used. The urea used may replace about an equal or greater weight of the salt ordinarily used. Thus, it may be stated that at least about 10% of the salt ordinarily used in the reaction may be replaced either by urea or one of the symmetrical N,N'-di (lower alkyl) ureas discussed above. Of course, the use of common salt may be entirely eliminated by replacing it with an equal or less than equal weight of urea, in which case the reaction is conducted in the presence of from about seven to about ten parts of urea by weight of the methane base.

Yields which are obtained by the use of the process of this invention range from about 12% to about 20% greater than those obtained from the prior art process. Thus, in an efficient laboratory operation, the prior art process results in yields of about 61% based on the methane base. Using similar conditions, in the process of this invention using a urea, this yield may be increased to up to about 75%.

Use of a urea in accordance with the process of the present invention should not be confused with the older practice of reacting tetramethyldiaminobenzophenone with urea, in the presence of a condensation catalyst to form auramine, as in German Patent 31,936. As there disclosed, auramine is prepared by reacting tetramethyldiaminobenzophenone with urea at 160° to 180° C., in the presence of zinc chloride. Urea is the main reactant, supplying the —NH radical in the final auramine product. Auramine also is known to result from reacting Michler's ketone with urea, and zinc chloride used in place of ammonium chloride. In that case, the mixture of urea and zinc chloride on heating, yields ammonium chloride, the reactant of the above-noted conventional operation.

The present invention is further illustrated by the following illustrative examples. Therein parts and percentages are based on parts by weight.

Example 1

To a jacketed, cylindrical kettle equipped with a close-fitting agitator is charged 1 part of tetramethyldiaminodiphenylmethane, 0.33 part of sulfur, 0.80 part of ammonium chloride, and 8.5 parts of urea-salt mixture containing 20% urea. Anhydrous ammonia gas is blown through the charge which is maintained at 170° C. After 6 hours, the reaction product is drowned in water and the product dye isolated by extraction with water. Auramine is obtained in a yield of 85% of theory, based on the weight of the methane base starting material.

Example 2

To show the desirable effect on the yield by the addition of urea to the reaction mixture, the procedure of Example 1 was followed identically except that no urea was added to the reaction mixture, the urea being replaced by an equal weight of salt. The yield of 85% fell to only 61%.

Example 3

The procedure of Example 1 was followed identically, except for the substitution of 8.5 parts of an N,N'-dimethyl urea salt mixture containing 14% of the urea. The yield of auramine was about 80%.

Example 4

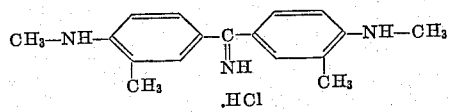

The procedure of Example 1 is followed except that bis-(4-methylamino-3-methylphenyl)methane is substituted for the methane base (tetramethyl-diaminodiphenylmethane). The yield is similar to that of Example 1.

Example 5

The procedure of Example 1 is followed except that 8.5 parts of urea are used in place of the urea-salt mixture.

The yield of auramine is correspondingly high.

Example 6

The procedure of Example 1 is followed except that the 8.5 parts of urea-salt mixture contains 90% urea. The yield of auramine is correspondingly high.

Example 7

The procedure of Example 1 is followed except that N,N-dimethyl - N'-N' - diethyldiaminodiphenylmethane is substituted for the methane base (tetramethyldiaminodiphenylmethane). A good yield of the corresponding analog of auramine is obtained.

No product was obtained when urea was omitted.

Example 8

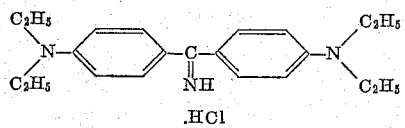
.HCl

The procedure of Example 1 is followed except that tetraethyldiaminodiphenylmethane is substituted for the tetramethyldiaminodiphenylmethane and the proportion of the reactants are as follows: 1 part tetraethyldiaminodiphenylmethane, 0.26 part sulfur, 0.35 part NH$_4$Cl and 6.7 parts of a urea-salt mixture containing 20% urea. The yield of the corresponding ethyl analog of auramine is over about 70%.

This synthesis cannot be accomplished using the conventional 100% salt reaction medium since an unworkable tarry mass results. In the same manner, other tetra-lower alkyl analogs of auramine can be prepared in accordance with this invention as shown in this example using a reaction medium containing a urea compound.

We claim:

1. In the process for the preparation of a compound of the formula:

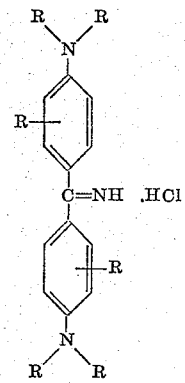

wherein R is individually selected from the group consisting of hydrogen and lower alkyl, by the reaction at an elevated temperature up to about 180° C. in an inert reaction medium, of a p,p'-diaminodiphenylmethane of the formula:

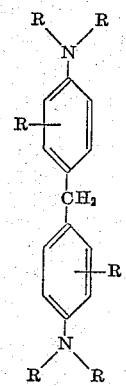

wherein R is as above defined, with sulfur and ammonium chloride and the after-treatment of the resulting reaction product with ammonia, the improvement wherein said reaction medium is a mixture of NaCl and at least 10% by weight of a member selected from the group consisting of urea and a symmetrical N,N'-di-lower alkyl-urea.

2. The process of claim 1 in which the member is present in an amount of at least 0.7 part by weight of the aminodiphenylmethane starting material.

3. The process of claim 1 wherein a urea compound constitutes 20% of the reaction medium.

4. The process of claim 1 wherein the urea compound is urea.

5. The process of claim 4 wherein the starting material is the compound of the formula:

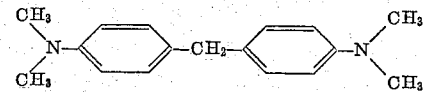

6. The process of claim 4 wherein the starting material is the compound of the formula:

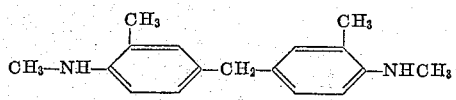

7. The process of claim 4 wherein the starting material is a compound of the formula:

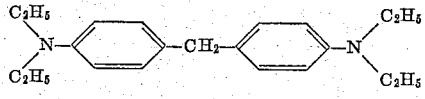

References Cited in the file of this patent

Matsuo et al.: C.A., vol. 47, page 4915 (1953).
Endo et al.: C.A., vol. 52, page 13798 (1958).